US010088843B1

(12) United States Patent
Radack et al.

(10) Patent No.: US 10,088,843 B1
(45) Date of Patent: Oct. 2, 2018

(54) SYSTEMS AND METHODS FOR CONFIGURABLE AVIONICS START SEQUENCING

(71) Applicant: Rockwell Collins, Inc., Cedar Rapids, IA (US)

(72) Inventors: David J. Radack, Robins, IA (US); John L. Hagen, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 108 days.

(21) Appl. No.: 15/199,905

(22) Filed: Jun. 30, 2016

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B64D 43/00* | (2006.01) |

(52) U.S. Cl.
CPC ........... *G05D 1/0055* (2013.01); *B64D 43/00* (2013.01)

(58) Field of Classification Search
CPC ...... B64D 43/00; G01C 23/00; G01C 23/005; G08G 5/0021; G08G 5/0013; G08G 5/0052
USPC ............................................................ 701/3
See application file for complete search history.

(56) References Cited

U.S. PATENT DOCUMENTS

| | | | | |
|---|---|---|---|---|
| 6,564,241 | B1 * | 5/2003 | Rosengard | .......... G06F 9/45504 434/29 |
| 7,937,341 | B2 * | 5/2011 | Gabarre | ................ G06F 9/4881 706/14 |
| 2007/0061116 | A1 * | 3/2007 | Bush | ...................... G01C 23/00 703/8 |

* cited by examiner

*Primary Examiner* — Maceeh Anwari
(74) *Attorney, Agent, or Firm* — Donna P. Suchy; Daniel M. Barbieri (57) ABSTRACT

A control circuit includes a plurality of processing circuits integrated in a single chip assembly and coupled to a memory device via an electronic bus. At least a first processing circuit is configured to execute avionics instructions independent of at least a second processing circuit. The memory device includes an avionics circuit, a configuration circuit, and a sequencing circuit. The avionics circuit includes a plurality of avionics instructions that when executed control operation of avionics systems in an airborne platform. The configuration circuit includes a plurality of criticality indications corresponding to the plurality of avionics instructions. The sequencing circuit is configured to generate a sequence for execution of avionics instructions based on the plurality of criticality indications to satisfy a system requirement for operation of the airborne platform, and cause the plurality of processing circuits to execute the plurality of avionics instructions according to the sequence.

17 Claims, 5 Drawing Sheets

SYSTEMS AND METHODS FOR CONFIGURABLE AVIONICS START SEQUENCING

BACKGROUND

The inventive concepts disclosed herein relate generally to the field of avionics systems. More particularly, embodiments of the inventive concepts disclosed herein relate to configurable avionics start sequencing using a multicore processor on an airborne platform.

Electronic avionics systems on airborne platforms, such as planes, jets, helicopters, and other manned or unmanned vehicles, are required to control and operate numerous complex, interconnected electronic systems. These electronic systems can include flight control and autopilot, navigation, flight display, communications, radar, and other systems required for safe operation of an airborne platform. Electronic aviation systems are required to meet certain design assurance levels for certification by regulatory bodies, such as the Federal Aviation Association, in order to ensure that the airborne platform is safe for operation, particularly during highly dynamic conditions such as cold start, takeoff, or warm start (e.g., a system restart due to an operator reset, a restart following a power glitch). The number and computational complexity of electronic applications required for electronic avionics systems continues to grow as feature requirements for airborne platforms increases. Although multicore processors can be used to facilitate execution of electronic applications in parallel to reduce the total time required to start up all necessary avionics systems, it is difficult to execute avionics applications in a manner that ensures safe operation and ensures that design assurance level requirements are met.

SUMMARY

In one aspect, the inventive concepts disclosed herein are directed to a control circuit. The control circuit includes a plurality of processing circuits integrated in a single chip assembly and coupled to a memory device via an electronic bus. Each of the plurality of processing circuits is configured to execute avionics instructions. At least a first processing circuit is configured to execute avionics instructions independent of at least a second processing circuit. The memory device includes an avionics circuit, a configuration circuit, and a sequencing circuit. The avionics circuit includes a plurality of avionics instructions that when executed control operation of avionics systems in an airborne platform. The configuration circuit includes a plurality of criticality indications corresponding to the plurality of avionics instructions. The sequencing circuit is configured to generate a sequence for execution of avionics instructions based on the plurality of criticality indications to satisfy a system requirement for operation of the airborne platform, and cause the plurality of processing circuits to execute the plurality of avionics instructions according to the sequence.

In a further aspect, the inventive concepts disclosed herein are directed to an airborne platform. The airborne platform includes an avionics system and a control circuit. The control circuit includes a plurality of processing circuits integrated in a single chip assembly and coupled to a memory device via an electronic bus. Each of the plurality of processing circuits is configured to execute avionics instructions. At least a first processing circuit is configured to execute avionics instructions independent of at least a second processing circuit. The memory device includes an avionics circuit, a configuration circuit, and a sequencing circuit. The avionics circuit includes a plurality of avionics instructions that when executed control operation of the avionics system. The configuration circuit includes a plurality of criticality indications corresponding to the plurality of avionics instructions. The sequencing circuit is configured to generate a sequence for execution of avionics instructions based on the plurality of criticality indications to satisfy a system requirement for operation of the airborne platform, and cause the plurality of processing circuits to execute the plurality of avionics instructions according to the sequence.

In a further aspect, the inventive concepts disclosed herein are directed to a method. The method includes determining criticality indications for avionics instructions, the avionics instructions configured for execution by one or more processing units integrated on a single chip assembly of an airborne platform; generating a sequence for execution of the avionics instructions based on the criticality indications to satisfy a system requirement for operation of the airborne platform; and causing the plurality of processing units to execute the avionics instructions based on the sequence.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for configurable avionics start sequencing. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft, a spacecraft, a ground-based vehicle, or in a non-vehicle application such as a ground-based display system, an air traffic control system, a radar system, a virtual display system).

In some embodiments, the airborne platform includes a multicore processor (e.g., a single chip assembly or die including a plurality of processing cores or units) configured to execute avionics instructions to operate avionics systems to ensure operation of the airborne platform in a manner consistent with a system requirement for the airborne platform. The multicore processor can be configured to execute the avionics instructions to ensure that critical avionics systems (e.g., systems without which the operation of the airborne platform would be hazardous) are operational. The system requirement can be related to a predetermined period of time (e.g., a maximum threshold time) within which the critical avionics systems should be operational. The system requirement can correspond to a minimum functionality of the airborne platform for safe operation of the airborne platform. For example, the system requirement can be a requirement for a critical set of avionics systems to be operational within a predetermined period of time after a triggering event (e.g., a user input requesting start-up of the airborne platform; a detected power glitch, system reset, power reset, or other reset; an indication of a particular operational state or a change in operational state, such as an indication of a landing or takeoff state).

The multicore processor can be included in a control circuit in the airborne platform. The control circuit can include a memory device, such that the multicore processor can retrieve avionics instructions from the memory device and execute the avionics instructions. The memory device can include an avionics circuit, a configuration circuit, and a sequencing circuit. The avionics circuit can include a plurality of avionics instructions that when executed control operation of avionics systems in the airborne platform. For example, the avionics circuit can include avionics instructions for initializing a flight control system, displaying a user interface of the flight control system to a pilot or other member of a flight deck crew of the airborne platform, receiving flight control inputs from the pilot via the user interface, and controlling operation of flight control instruments and devices (e.g., jet engine control, aircraft directional controls, etc.) based on the flight control inputs. The configuration circuit can include a plurality of criticality indications corresponding to the plurality of avionics instructions. The sequencing circuit can be configured to generate a sequence for execution of the plurality of avionics instructions based on the plurality of criticality indications to satisfy a system requirement for operation of the airborne platform, and cause the plurality of processing circuits to execute the plurality of avionics instructions according to the sequence. As such, airborne platforms and avionics systems manufactured in accordance with or implementing the inventive concepts disclosed herein can improve performance and handle more complex systems while meeting increasingly strict design assurance requirements for critical avionics applications, such as by ensuring that critical avionics applications and systems are operational in time for a pilot to perform an aircraft maneuver.

Figure 1A:
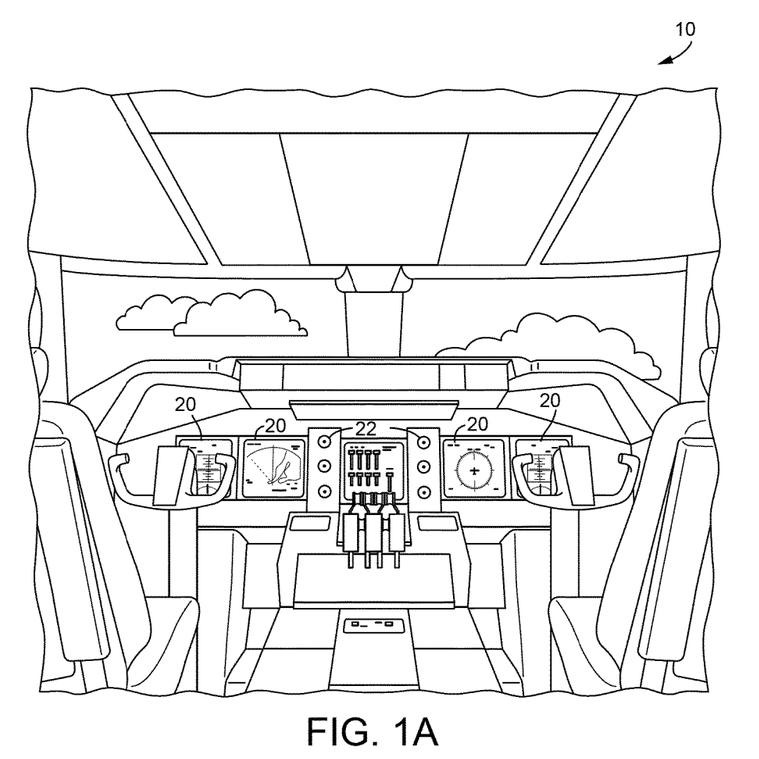
FIG. 1A is a schematic illustration of an exemplary embodiment of an aircraft control center according to the inventive concepts disclosed herein.

Referring to FIG. 1A, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to provide a rendered display from the systems and methods of the inventive concepts disclosed herein.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft.

Figure 1B:
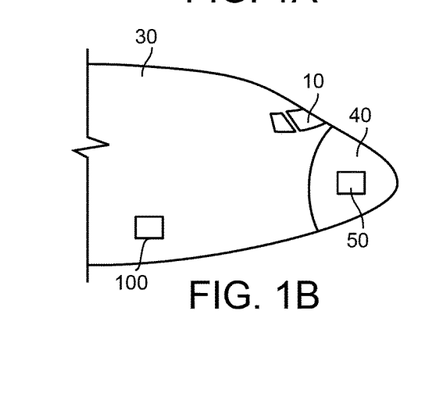
FIG. 1B is a schematic illustration of an exemplary embodiment of an aircraft according to the inventive concepts disclosed herein.

Referring now to FIG. 1B, an aircraft 30 is shown according to an exemplary embodiment of the inventive concepts disclosed herein. The aircraft 30 includes a nose 40, a radar system 50, and the aircraft control center or cockpit 10. The radar system 50, such as a weather radar system or other radar system, is generally located inside the nose 40 of the aircraft 30; portions of the radar system 50 (e.g., a user interface of the radar system 50) may be located inside the cockpit 10 of the aircraft 30. According to exemplary embodiments of the inventive concepts disclosed herein, the radar system 50 may be located anywhere on the aircraft 30, such as on the top of the aircraft 30, on the belly of the aircraft 30, on the tail of the aircraft 30, or on either or both sides of the aircraft 30. Various components of the radar system 50 may be distributed at multiple locations throughout the aircraft 30. The radar system 50 may include or be coupled to an antenna system of the aircraft 30. The radar system 50 or other equipment onboard the aircraft 30 may be configured to receive weather data from other sources. For example, the radar system 50 or other equipment aboard the aircraft 30 may receive weather data from ground-based weather radar systems, satellite-based systems, and from aircraft-based system of other aircraft. The radar system 50 may be any radar system configured to detect or receive data for the systems and methods of the inventive concepts disclosed herein.

In some embodiments, the aircraft 30 includes a control circuit 100. The control circuit 100 can be configured to control operation of avionics systems of the aircraft 30. The control circuit 100 can be located in a location of the aircraft 30 that allows for stable operation during dynamic environmental conditions experienced by the aircraft 30. For example, the control circuit 100 can be located in an interior of the aircraft 30 at which the local temperature is advantageous for operation of the control circuit 100 (e.g., relatively constant temperature; relatively low temperature facilitating cooling of the control circuit 100). The control circuit 100 can be operatively coupled to a power supply (not shown) that is independent of a main power supply of the aircraft 30, allowing for more stable and/or robust operation of the control circuit 100.

Figure 2:
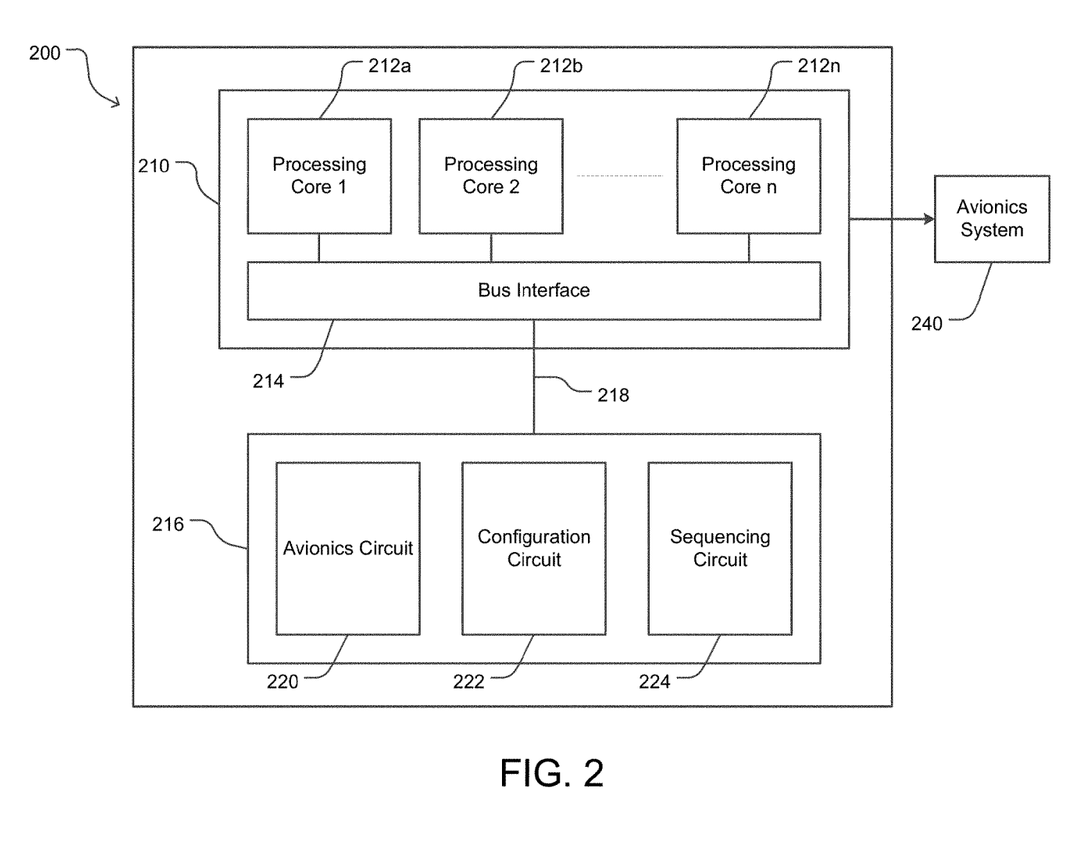
FIG. 2 is a block diagram of an exemplary embodiment of a control circuit for configurable avionics start sequencing according to the inventive concepts disclosed herein.

Referring now to FIG. 2, a control circuit 200 is shown according to the inventive concepts disclosed herein. The control circuit 200 can be similar to the control circuit 100 shown in FIG. 1B, and can be included in an airborne platform, such as an aircraft 30. The control circuit 200 includes a multicore processor 210, a memory device 216, and an electronic bus 218 coupling the multicore processor 210 to the memory device 216. The control circuit 200 can be configured to control operation of an avionics system 240, such as by outputting an electronic signal to the avionics system 240 that includes avionics instructions configured to control operation of the avionics system 240. The avionics system 240 as shown in FIG. 2 can represent one or more of the various avionics systems of the aircraft 30.

The multicore processor 210 is configured to execute avionics instructions, such as avionics instructions retrieved from the memory device 216. The multicore processor 210 can include a plurality of processing cores 212a-212n (e.g., processing circuits, processing units). The processing cores 212a-212n can be integrated on a single chip assembly, on a single integrated circuit die, in a single chip package. The processing cores 212a-212n can be controlled to execute avionics instructions simultaneously. In some embodiments, the processing cores 212a-212n include local memory (e.g., a cache) for locally storing avionics instructions for execution. Each processing core 212a-212n can include a corresponding cache dedicated to the processing core 212a. Upon executing avionics instructions, the multicore processor 210 can output commands or control signals to the avionics system 240, the commands or control signal including electronic instructions configured for reception, processing, and/or execution by the avionics system 240.

The multicore processor 210 can include a bus interface 214. The bus interface 214 is configured to route avionics instructions from the memory device 216 to the processing cores 212a-212n. As shown in FIG. 2, the bus interface 214 is communicatively coupled in parallel to each of the processing cores 212a-212n. The bus interface 214 is also communicatively coupled to the electronic bus 218, such that the processing cores 212a-212n can receive or retrieve avionics instructions via the electronic bus 218 and the bus interface 214.

The memory device 216 is configured to store information including avionics instructions (e.g., electronic avionics instructions, including electronic avionics instructions organized as firmware or software). The memory device 216 can include various electronic circuits, modules, engines, and/or control logic that cause the multicore processor 210 to execute the systems and methods described herein (e.g., the electronic information of avionics circuit 220, configuration circuit 222, sequencing circuit 224, or other electronic code, programs, software, and/or firmware can be provided or organized as part of circuits, modules, and/or engines). The memory device 216 can be or include volatile memory or non-volatile memory and may include database components, object code components, script components, executable avionics instructions, machine-readable code or instructions, or any other type of information structure for supporting the various activities and information structures of the inventive concepts disclosed herein. The memory device 216 can be communicably connected to the multicore processor 210 (e.g., by a wired connection via the electronic bus 218) and can include computer code or instruction circuits for executing one or more processes described herein.

In some embodiments, the memory device 216 includes an avionics circuit 220. The avionics circuit 220 includes a plurality of avionics instructions (e.g., machine-readable code) that when executed control operation of avionics systems 240 in the aircraft 30. As an illustrative example, the avionics instructions can include instructions to initialize a flight control system, such as by initializing or otherwise activating a user interface of the flight control system such that the flight control system can receive user inputs at the user interface, and process the user inputs in order to cause flight control actions.

In some embodiments, the memory device 216 includes a configuration circuit 222. The configuration circuit 222 can include a plurality of criticality indications corresponding to the plurality of avionics instructions. The criticality indications can indicate whether an avionics system to be initialized and controlled based on the avionics instructions is critical in order to meet a system requirement for operation of the aircraft 30 and/or for safe operation of the aircraft 30. The configuration circuit 222 can be configured to store the criticality indications. The configuration circuit 222 can store the plurality of criticality indications in a configuration file. The configuration circuit 222 can include a database or other data structure mapping (e.g., associating) criticality indications to avionics instructions.

The criticality indications can be a binary indication (e.g., critical or non-critical). The criticality indications can be a gradation of indications (e.g., a numerical or otherwise discrete gradation from a non-critical or low criticality level to a critical or highly critical level, such as integer gradations from zero to five, zero to ten). Each criticality indication can associate a criticality value on a discrete scale of ordered values from critical to non-critical. The criticality indications can correspond to design assurance levels ("DALs"), such as the DO-178B DALs or the DO-178C DALs. For example, the criticality indications can include a catastrophic level, corresponding to a failure rate of no more than 1.0E-9 failures per hour ("DAL A"); a hazardous/severe-major level, corresponding to a failure rate of no more than 1.0E-7 failures per hour ("DAL B"); a major level, corresponding to a failure rate of no more than 1.0E-5 failures per hour ("DAL C"); a minor level, corresponding to a failure rate of no more than 1.0E-3 failures per hour ("DAL D"); and a no effect level ("DAL E").

In some embodiments, the criticality indications relate to a temporal urgency of avionics systems 240. For example, avionics instructions (or avionics system 240 to be initialized using the avionics instructions) can be labeled as critical, or can have a relatively greater criticality indication, if operation of the associated avionics system 240 is relatively urgent (e.g., operation of the associated avionics system 240 is required to occur within a predetermined period of time).

In some embodiments, the system requirement for operation of avionics systems 240 for the aircraft 30 is a maximum threshold time by which avionics systems 240 must be (or are expected or designed to be) operational, and the criticality indications are determined to be critical or non-critical based on whether corresponding avionics systems 240 must be operational by the maximum threshold time. In some embodiments, the system requirement includes a plurality of time thresholds, and the criticality indications for a particular avionics system 240 can include non-critical indications up to a first time threshold, and critical indications after the first time threshold. For example, if the system requirement includes time thresholds of one, two, and three seconds, if a particular avionics system 240 must be (or is expected to be or designed to be) operational within three seconds, then the corresponding criticality indications may be non-critical up to the thresholds of one and two seconds, and critical after the two second threshold.

In some embodiments, the configuration circuit 222 can be configured to determine a criticality indication for avionics instructions based on the avionics systems 240 to be controlled using the avionics instructions and an operating state or operating condition of the aircraft 30. For example, the configuration circuit 222 can receive an indication as to whether the aircraft 30 is executing a cold start or a warm start operation, identify avionics systems 240 that are critical for operation during cold start and/or warm start, and determine the criticality indication based on whether it is critical to start the corresponding avionics system 240 during the cold start or warm start operation.

The sequencing circuit 224 or the configuration circuit 222 can include a mapping (e.g., a mapping stored in a database) between operating states and criticality indications. For example, the configuration circuit 222 can include pre-stored criticality indications corresponding to how critical operation of a particular avionics system 240 is for a particular operating state. The mapping can be configured to associate the pre-stored criticality indications to the operating state. In some embodiments, the sequencing circuit 224 can be configured to receive an indication of a current operating state, and perform a query of the mapping in response to receiving the indication of the current operating state to retrieve the pre-stored criticality indications corresponding to the current operating state.

The operating state can be one of a cold start state or a warm start state. The cold start state can correspond to a state in which minimal or no components or avionics systems 240 of the aircraft 30 are operational, such as when most or all components of the aircraft 30 are off, when the aircraft 30 is to begin take-off procedures, or when an engine of the aircraft 30 has not been operational for a long enough period that the engine is at equilibrium with an outside environment. The warm start state can correspond to a state in which most components or avionics systems 240 of the aircraft 30 are on and/or operational. The warm start state can correspond to a state in which certain avionics systems 240 have been reset, such as a reset caused by an operator input, or a power glitch such as noise on a power line.

The operating state can be an emergency state. For example, during an emergency takeoff or landing procedure, operation of certain avionics systems 240 necessary for takeoff or landing (e.g., an avionics system 240 that controls landing gear) may be prioritized to ensure a system requirement for the operating state is satisfied.

In some embodiments, the configuration circuit 222 is configured to determine or modify the plurality of criticality indications based on an operating state of the aircraft 30. For example, if the operating state indicates that a particular avionics system 240 is of high priority for operation, then the configuration circuit 222 can determine the particular avionics system 240 to be critical. In some embodiments, if the configuration circuit 222 receives an error signal indicating that the particular avionics system 240 is not operational or otherwise in an error condition, the configuration circuit 222 can determine the particular avionics system 240 to be critical.

In some embodiments, the memory device 216 includes a sequencing circuit 224. The sequencing circuit 224 is configured to generate a sequence for execution of avionics instructions based on the plurality of criticality indications to satisfy a system requirement for operation of the airborne platform. The sequencing circuit 224 is configured to cause the plurality of processing cores 212a-212n to execute the plurality of avionics instructions according to the sequence. The sequencing circuit 224 can be configured to prioritize (e.g., cause execution of in a priority-based order, such as an order in which higher priority instructions are executed prior to lower priority instructions) critical avionics instructions. In some embodiments, if execution of a first avionics instructions is required prior to execution of a second avionics instructions (e.g., if operation of a second avionics system 240 associated with the second avionics instructions depends on operation of a first avionics system 240 associated with the first avionics instructions), the sequencing circuit 224 can be configured to generate a sequence that prioritizes execution of the first avionics instructions. In some embodiments, the sequencing circuit 224 is configured to determine the sequence by prioritizing execution of critical avionics instructions prior to execution of non-critical avionics instructions (e.g., based on an order indicated by criticality value, where each criticality indication associates a criticality value on a discrete scale of ordered values from critical to non-critical).

In some embodiments, the sequencing circuit 224 is configured to cause a first one or more processing cores 212 to load avionics instructions that are critical, causing a second one or more processing cores 212 (e.g., a different one or more processing cores from the first one or more processing cores 212) to hold in a reset mode while the critical avionics instructions are loading, and cause the second one or more processing cores to load avionics instructions that are non-critical in response to receiving an indication that the avionics instructions that are critical have been loaded by the first one or more processing cores 212. In some embodiments, by allocating execution of critical avionics instructions to the first one or more processing cores 212 prior to execution of non-critical avionics instructions to the second one or more processing cores 212, the sequencing circuit 224 can ensure that bandwidth for transmitting critical avionics instructions from the memory 216 to the first one or more processing cores 212 via the electronic bus 218 and the bus interface 214 is not interfered by transmitting non-critical avionics instructions from the memory 216 to the second one or more processing cores 212.

In some embodiments, if execution of a first avionics instructions is required prior to execution of a second avionics instructions (e.g., if operation of a second avionics system 240 associated with the second avionics instructions depends on operation of a first avionics system 240 associated with the first avionics instructions), the sequencing circuit 224 can generate the sequence to prioritize execution of the first avionics instructions. The sequencing circuit 224 can determine that the second avionics instructions depends on the first avionics instructions based on criticality indications or other information stored in the configuration circuit 222 and associating the dependency with the first avionics instructions and the second avionics instructions.

Figure 3:
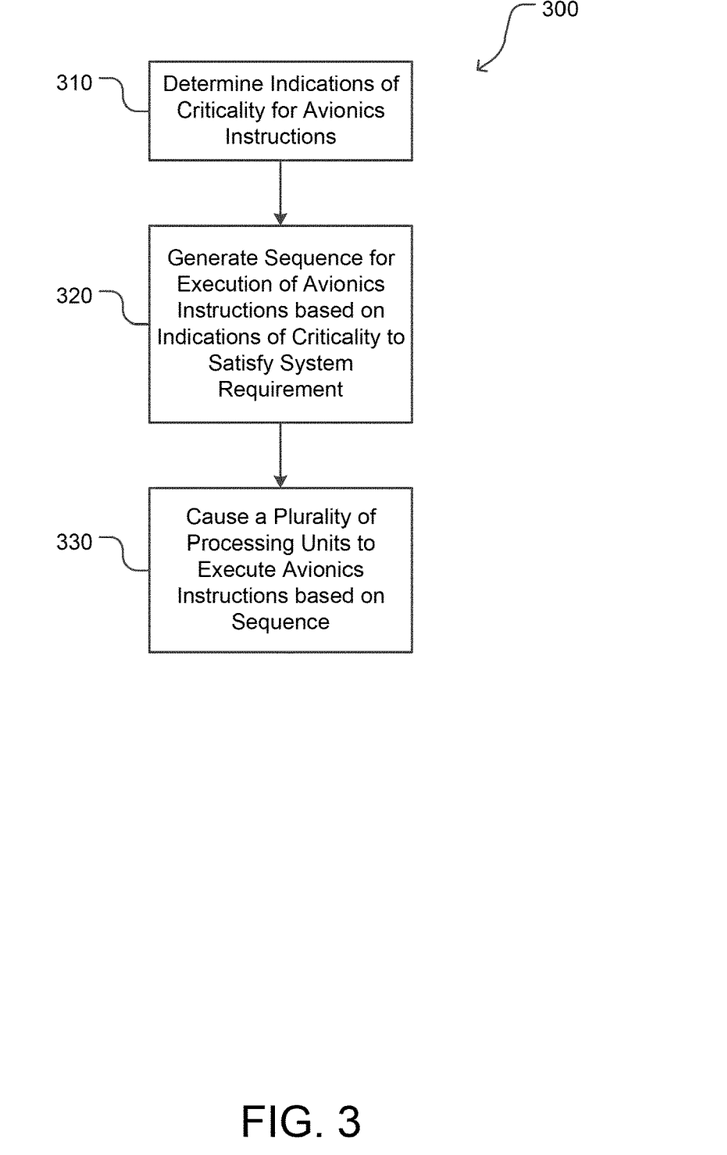
FIG. 3 is a diagram of an exemplary embodiment of a method of configurable avionics start sequencing according to the inventive concepts disclosed herein.

Referring now to FIG. 3, an exemplary embodiment of a method 300 according to the inventive concepts disclosed herein may include the following steps. The method 300 may be performed using various hardware, apparatuses, and systems disclosed herein, such as the aircraft 30, the control circuit 200, and/or components thereof. The method may be performed as part of controlling execution of avionics instructions for operation of avionics systems 240 of the aircraft 30.

A step (310) may include determining indications of criticality for avionics instructions. The criticality indications can indicate whether an avionics system to be initialized and controlled based on the avionics instructions is critical in order to meet a system requirement for operation of the aircraft 30. The criticality indications can be a binary indication (e.g., critical or non-critical). The criticality indications can be a gradation of indications (e.g., a numerical or otherwise discrete gradation from a non-critical or low criticality level to a critical or highly critical level, such as integer gradations from zero to five, zero to ten, etc.). The criticality indications can correspond to design assurance levels ("DALs"), such as the DO-178B DALs or the DO-178C DALs. The criticality indications can relate to a system requirement for operation of the aircraft 30, such as a system requirement that includes one or more time-based thresholds upon which avionics systems 240 must be (or are designed to be or expected to be) operational.

In some embodiments, the criticality indications are determined based on an operating state or operating condition of the aircraft 30. For example, the operating state can be one of a cold start or warm start state, and the criticality indications can be determined based on which avionics systems 240 are critical for operation for a cold start or warm start.

A step (320) may include generating a sequence for execution of avionics instructions based on the criticality indications to satisfy a system requirement for operation of the aircraft 30. The sequence can be an order in which higher priority instructions are to be executed prior to lower priority instructions, such as to prioritize execution of critical avionics instructions prior to execution of non-critical avionics instructions, or to prioritize execution of avionics instructions of relatively greater criticality prior to execution of avionics instructions of relatively lesser criticality. If execution of a first avionics instructions is required prior to execution of a second avionics instructions, the sequence can be generated to prioritize execution of the first avionics instructions.

A step (330) may include causing a plurality of processing units integrated on a single chip assembly (e.g., processing units/cores of a single multi-core processor) to execute avionics instructions based on the sequence. For example, critical avionics instructions can be loaded on, retrieved by, transmitted to, or otherwise received by one or more processing units, and executed prior to execution of non-critical avionics instructions (or prior to execution of avionics instructions having relatively lesser criticality). As such, avionics systems 240 that are necessary to be operational to meet a system requirement (or designed to or expected to be operational to meet the system requirement) are made operational to satisfy the system requirement.

Figure 4:
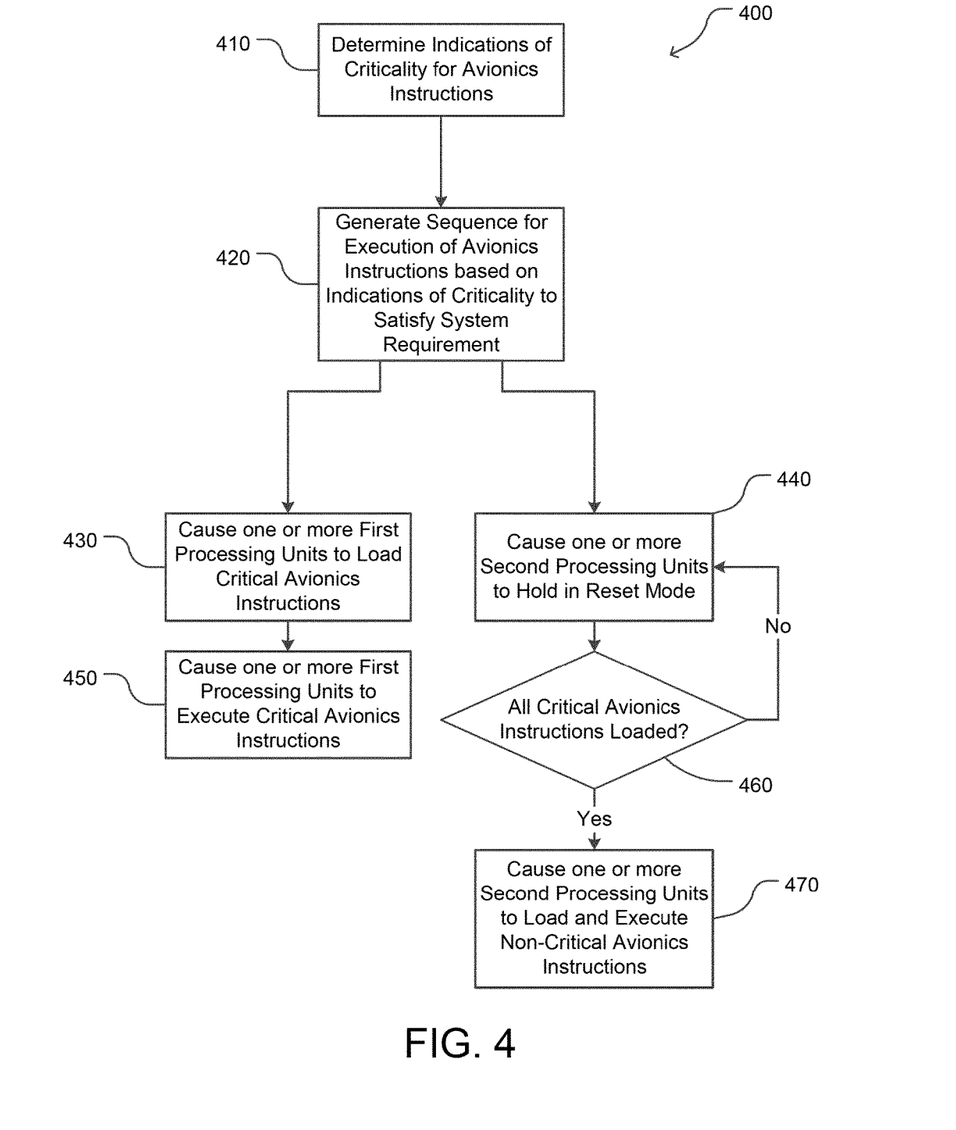
FIG. 4 is a diagram of another exemplary embodiment of a method of configurable avionics start sequencing according to the inventive concepts disclosed herein.

Referring now to FIG. 4, an exemplary embodiment of a method 400 according to the inventive concepts disclosed herein may include the following steps. The method 400 may be performed using various hardware, apparatuses, and systems disclosed herein, such as the aircraft 30, the control circuit 200, and/or components thereof. The method may be performed as part of controlling execution of avionics instructions for operation of avionics systems 240 of the aircraft 30.

A step (410) may include determining indications of criticality for avionics instructions. The determination may be similar to the determination described with respect to method 300. A step (420) may include generating a sequence for execution of avionics instructions based on the indications of criticality to satisfy a system requirement for operation of the aircraft 30. The sequence may be generated in a similar manner as described with respect to method 300, with the exception of the control of processing units as described further below.

A step (430) may include causing one or more first processing units to load critical avionics instructions. For example, based on the sequence for execution of the avionics instructions, it can be determined that execution of certain avionics instructions are critical for satisfying a system requirement for the aircraft, such as by making certain avionics systems 240 operational within a threshold time corresponding to the system requirement.

A step (440) may include causing one or more second processing units to hold in a reset mode. The one or more second processing units are part of the same multi-core processor as the one or more first processing units (e.g., the one or more first processing units and the one or more second processing units are integrated in a single chip assembly or on a single die). In some embodiments, an electronic instruction causing the one or more second processing units to hold in a reset mode may be transmitted (e.g., transmitted simultaneously) with an electronic instruction causing the one or more first processing units to load critical avionics instructions. In some embodiments, the processing units require electronic instructions to load or otherwise retrieve avionics instructions, such that the one or more second processing units default to a reset mode unless an electronic instruction is transmitted to cause the one or more second processing units to load avionics instructions.

A step (450) may include causing the one or more first processing units to execute critical avionics instructions. The critical avionics instructions may be executed to satisfy a system requirement for operation of the aircraft 30, such as by activating avionics systems 240 that are required to be operational to satisfy the system requirement.

A step (460) may include determining whether all critical avionics instructions are loaded. For example, the sequence for execution of avionics instructions may include a flag (or other indication of a check) corresponding to the final critical avionics instructions and/or the first non-critical avionics instructions, such that the flag can be checked to determine whether all critical avionics instructions are loaded. An indication can be received from the one or more first processing units that all critical avionics instructions are loaded.

If all critical avionics instructions are not loaded, then the one or more second processing units may be continued to be held in a reset mode. If all critical avionics instructions are loaded, then a step (470) may include causing one or more second processing units to load and execute non-critical avionics instructions. In some embodiments, by prioritizing loading of critical avionics instructions prior to loading of non-critical avionics instructions, bandwidth required to load critical avionics instructions by the one or more first processing units is not interfered with by loading non-critical avionics instructions.

Figure 5:
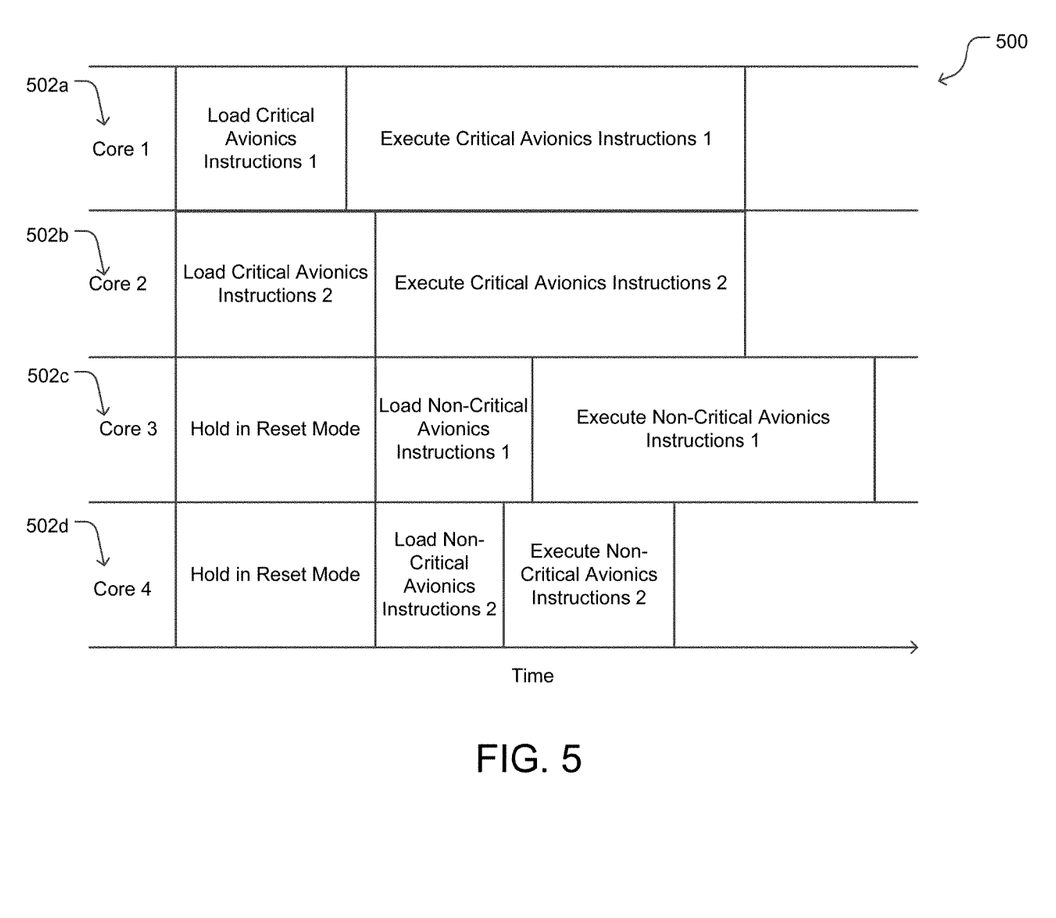
FIG. 5 is a schematic diagram of a sequence for configurable avionics start sequencing according to the inventive concepts disclosed herein.

Referring now to FIG. 5, an exemplary embodiment of a sequencing diagram 500 according to the inventive concepts disclosed herein is illustrated. The sequencing diagram 500 illustrates how a control circuit (e.g., control circuit 200) can control execution of avionics instructions for operation of avionics systems (e.g., avionics systems 240) to meet a system requirement for an airborne platform (e.g., aircraft 30). As shown in FIG. 5, a multicore processor can include four processing cores 502a, 502b, 502c, 502d. The processing cores 502a-502d can be similar or identical to the processing cores 212a-212n as described with reference to FIG. 2, and can retrieve avionics instructions for execution from a memory device similar or identical to the memory device 216 as described with reference to FIG. 2.

The processing cores 502a, 502b are configured to load and execute critical avionics instructions. The processing cores 502c, 502d are configured to load and execute non-critical avionics instructions. While the processing cores 502a, 502b are loading critical avionics instructions, the processing cores 502c, 502d are held in reset mode. After both the processing cores 502a, 502b complete loading of critical avionics instructions, the processing cores 502c, 502d may load non-critical avionics instructions. For example, as shown in FIG. 5, the time required for the second critical avionics instructions to be loaded by the processing core 502b is greater than for the first avionics instructions to be loaded by the processing core 502a; the processing cores 502c, 502d are held in reset until the second critical avionics instructions are loaded. After each processing core 502a, 502b, 502c, 502d completes loading of the corresponding avionics instructions, each processing core 502*a*, 502*b*, 502*c*, 502*d* may execute the corresponding avionics instructions.

As will be appreciated from the above, systems and methods for configurable avionics start sequencing according to embodiments of the inventive concepts disclosed herein may improve operation of aircraft avionics systems by satisfying system requirements for operation of the avionics systems, such as by activating critical avionics systems more rapidly and prior to activating non-critical avionics systems.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A control circuit comprising:
a plurality of processing circuits integrated in a single chip assembly, each of the processing circuits configured to execute avionics instructions, at least one first processing circuit configured to execute avionics instructions independent of at least one second processing circuit; and
a memory device coupled to the plurality of processing circuits via an electronic bus, the memory device comprising:
an avionics circuit comprising a plurality of avionics instructions that when executed control operation of avionics systems in an airborne platform;
a configuration circuit comprising a plurality of criticality indications corresponding to the plurality of avionics instructions; and
a sequencing circuit configured to:
generate a sequence for execution of avionics instructions based on the plurality of criticality indications to satisfy a system requirement for operation of the airborne platform; and
cause the plurality of processing circuits to execute the plurality of avionics instructions according to the sequence by:
causing the at least one first processing circuit to load avionics instructions that are critical;
causing the at least one second processing circuit to hold in a reset mode while the critical avionics instructions are loading; and
causing the at least one second processing circuit to load avionics instructions that are non-critical in response to receiving an indication that the avionics instructions that are critical have been loaded by the first one or more processing circuits.

2. The control circuit of claim 1, wherein each criticality indication indicates if avionics instructions are critical or non-critical, and the sequencing circuit is further configured to determine the sequence by prioritizing execution of critical avionics instructions prior to execution of non-critical avionics instructions.

3. The control circuit of claim 1, wherein each criticality indication associates a criticality value on a discrete scale of ordered values from critical to non-critical, and the sequencing circuit is further configured to determine the sequence by prioritizing execution of avionics instructions based on an order indicated by the criticality value.

4. The control circuit of claim 3, wherein the criticality values are based on a plurality of design assurance levels including a catastrophic level, a hazardous level, a major level, a minor level, and a no effect level, the criticality values decreasing in criticality in order from the catastrophic level to the no effect level.

5. The control circuit of claim 1, wherein the system requirement corresponds to a minimum functionality of the airborne platform for safe operation of the airborne platform.

6. The control circuit of claim 1, wherein the configuration circuit is configured to determine the plurality of criticality indications based on an operating state of the airborne platform to satisfy an operating state requirement corresponding to the operating state.

7. The control circuit of claim 6, wherein the operating state is one of a cold start state or a warm start state.

8. An airborne platform, comprising:
an avionics system; and
a control circuit comprising:
a plurality of processing circuits integrated in a single chip assembly, each of the processing circuits configured to execute avionics instructions, at least one first processing circuit configured to execute avionics instructions independent of at least one second processing circuit; and
a memory device coupled to the plurality of processing circuits via an electronic bus, the memory device comprising:
an avionics circuit comprising a plurality of avionics instructions that when executed control operation of the avionics system;
a configuration circuit comprising a plurality of criticality indications corresponding to the plurality of avionics instructions; and
a sequencing circuit configured to:
generate a sequence for execution of avionics instructions based on the plurality of criticality indications to satisfy a system requirement for operation of the avionics system; and
cause the plurality of processing circuits to execute the plurality of avionics instructions according to the sequence by:
causing the at least one first processing circuit to load avionics instructions that are critical;
causing the at least one second processing circuit to hold in a reset mode while the critical avionics instructions are loading; and
causing the at least one second processing circuit to load avionics instructions that are non-critical in response to receiving an indication that the avionics instructions that are critical have been loaded by the first one or more processing circuits.

9. The airborne platform of claim 8, wherein each criticality indication indicates if avionics instructions are critical or non-critical, and the sequencing circuit is further configured to determine the sequence by prioritizing execution of critical avionics instructions prior to execution of non-critical avionics instructions.

10. The airborne platform of claim 8, wherein each criticality indication associates a criticality value on a discrete scale of ordered values from critical to non-critical, and the sequencing circuit is further configured to determine the sequence by prioritizing execution of avionics instructions based on an order indicated by the criticality value.

11. The airborne platform of claim 10, wherein the criticality values are based on a plurality of design assurance levels including a catastrophic level, a hazardous level, a major level, a minor level, and a no effect level, the criticality values decreasing in criticality in order from the catastrophic level to the no effect level.

12. The airborne platform of claim 8, wherein the system requirement corresponds to a minimum functionality of the avionics system for safe operation of the avionics system.

13. The airborne platform of claim 8, wherein the configuration circuit is configured to determine the plurality of criticality indications based on an operating state to satisfy an operating state requirement corresponding to the operating state, wherein the operating state is one of a cold start state or a warm start state.

14. A method, comprising:
  determining criticality indications for avionics instructions, the avionics instructions configured for execution by one or more processing units integrated on a single chip assembly of an airborne platform;
  generating a sequence for execution of the avionics instructions based on the criticality indications to satisfy a system requirement for operation of the airborne platform; and
  causing the plurality of processing units to execute the avionics instructions based on the sequence by:
    causing at least one first processing unit of the plurality of processing units to load avionics instructions that are critical;
    causing at least one second processing unit of the plurality of processing units to hold in a reset mode while the critical avionics instructions are loading; and
    causing the at least one second processing unit to load avionics instructions that are non-critical in response to receiving an indication that the avionics instructions that are critical have been loaded by the first one or more processing circuits.

15. The method of claim 14, wherein each criticality indication indicates if avionics instructions are critical or non-critical, the method further comprising determining the sequence by prioritizing execution of critical avionics instructions prior to execution of non-critical avionics instructions.

16. The method of claim 14, wherein the criticality indications are based on a plurality of design assurance levels including a catastrophic level, a hazardous level, a major level, a minor level, and a no effect level, the criticality values decreasing in criticality in order from the catastrophic level to the no effect level.

17. The method of claim 14, further comprising determining the plurality of criticality indications based on an operating state to satisfy an operating state requirement corresponding to the operating state, wherein the operating state is one of a cold start state or a warm start state.

* * * * *